(12) United States Patent  
Kim et al.

(10) Patent No.: US 7,515,811 B2  
(45) Date of Patent: Apr. 7, 2009

(54) METHOD OF MAINTAINING EDIT SUMMARY INFORMATION ON A REWRITABLE STORAGE MEDIUM

(75) Inventors: Mi Hyun Kim, Seoul (KR); Sung Ryun Cho, Seoul (KR); Byung Jin Kim, Kyunggi-do (KR); Kang Soo Seo, Kyunggi-do (KR); Sung Wan Park, Suwon-si (KR)

(73) Assignee: LG Electronics, Inc., Seoul (KR)

( * ) Notice: Subject to any disclaimer, the term of this patent is extended or adjusted under 35 U.S.C. 154(b) by 848 days.

(21) Appl. No.: 10/446,128

(22) Filed: May 28, 2003

(65) Prior Publication Data

US 2003/0228134 A1    Dec. 11, 2003

(30) Foreign Application Priority Data

Jun. 5, 2002 (KR) .............. 10-2002-0031747

(51) Int. Cl.
| | |
|---|---|
| H04N 5/00 | (2006.01) |
| H04N 5/91 | (2006.01) |
| H04N 5/93 | (2006.01) |
| H04N 7/00 | (2006.01) |
| H04N 9/00 | (2006.01) |
| G06F 3/00 | (2006.01) |
| G06F 3/048 | (2006.01) |
| G06F 17/30 | (2006.01) |
| G11B 11/00 | (2006.01) |
| G11B 27/00 | (2006.01) |

(52) U.S. Cl. ............... 386/52; 386/4; 386/55; 386/69; 386/95; 386/96; 386/120; 386/125; 386/126; 369/53.34; 369/83; 707/2; 715/723; 715/788; 715/800; 715/838

(58) Field of Classification Search ............ 386/4, 386/52, 55, 69, 95, 96, 120, 125, 126; 369/83, 369/53.34; 715/723, 788, 800, 838; 707/2
See application file for complete search history.

(56) References Cited

U.S. PATENT DOCUMENTS

| 5,946,677 | A  * | 8/1999 | Bullen ............... 707/2 |
| 6,400,667 | B1 * | 6/2002 | Utsumi et al. ...... 369/53.34 |
| 7,054,540 | B2 * | 5/2006 | Nomura et al. ..... 386/52 |
| 7,149,974 | B2 * | 12/2006 | Girgensohn et al. .... 715/723 |
| 2002/0150383 | A1 * | 10/2002 | Kato et al. ......... 386/69 |
| 2003/0108335 | A1 * | 6/2003 | Nakamura et al. ... 386/95 |

FOREIGN PATENT DOCUMENTS

KR    1020000025848 A    5/2000

* cited by examiner

Primary Examiner—Thai Tran  
Assistant Examiner—Syed Y Hasan  
(74) Attorney, Agent, or Firm—Birch, Stewart, Kolasch & Birch, LLP

(57) ABSTRACT

The present method of maintaining edit summary information on a rewritable storage medium maintains edit summary information (TableOfFastEditInfo) about real play list files, virtual play list files, and clip information files recorded on a rewritable storage medium such as a BD-RW with a view to facilitating editing of a play list, thereby making it possible to delete a part or the whole of a real play list selected by a user fast by consulting the edit summary information.

23 Claims, 6 Drawing Sheets

FIG. 5 info.dvr - syntax

| info.dvr { |
|---|
| version_number |
| TableOfPlayLists_start_address |
| MarkersPrivateData_start_address |
| reserved_for_future_use |
| UIAppInfoDVR() |
| for(i=0; i<N1; i++){ |
| padding_word |
| } |
| TableOfPlayLists() |
| for(i=0; i<N2; i++){ |
| padding_word |
| } |
| MakersPrivateData() |
| for(i=0; i<N3; i++){ |
| padding_word |
| } |
| } |

| MakersPrivateData(){ |
|---|
| length |
| if(length !=0){ |
| data_block_start_address |
| reserved_for_word_align |
| number_of_maker_entries |
| for (i=0; i<number_of_maker_entries; i++){ |
| maker_ID |
| maker_model_code |
| mpd_start_address |
| mpd_length |
| } |
| for (i=0; i<L1; i++){ |
| padding_word |
| padding_word |
| } |
| data_block { |
| summary_info_exist_flag |
| reserved |
| TableOfFastEditInfo(i) |
| } |

FIG. 6

TableOfFastEditInfo(i)

| length | | | 16(bits) |
|---|---|---|---|
| ClipInfo_in_Real_PalyList_start_address | | | 16 |
| Total_n_info | total_n_of_PlayItems | | 16 |
| | total_n_of_EP_coarse_entries | | 16 |
| | total_n_of_EP_fine_entries | | 16 |
| | total_n_of_program_sequences | | 32 |
| n_of_Real_PlayLists (=c1) | | | 16 |
| for(i=0;i <c1; i++) | Real_PlayList_file_index(or name) | | 16 |
| | n_of_ref_to_Clip (=c2) | | 16 |
| | for(i=0;i <c2; i++) | Clip_Info_file_index(or name) | 16 |
| for(i=0;i <M1; i++) | padding_word # i | | 16 |
| n_of_Clip_Info_In_Real_PlayList (=c3) | | | 16 |
| for(i=0;i <c3; i++) | Clip_Info_file_index(or name) | | 16 |
| | n_of_ref_to_virtual_PlayList (=c4) | | 16 |
| | for(i=0;i <c4; i++) | write_protect_flag | 1 |
| | | Virtual_PlayList_file_index(or name) | 15 |

FIG. 7 info.dvr - syntax

| info.dvr { |
|---|
| version_number |
| TableOfPlayLists_start_address |
| TableOfFastEditInfo_start_address |
| MarkersPrivateData_start_address |
| reserved_for_future_use |
| UIAppInfoDVR() |
| for(i=0; i<N1; i++){ |
| padding_word |
| } |
| TableOfPlayLists() |
| for(i=0; i<N2; i++){ |
| padding_word |
| } |
| TableOfFastEditInfo() |
| for(i=0; i<N3; i++){ |
| padding_word |
| } |
| MakersPrivateData() |
| for(i=0; i<N4; i++){ |
| padding_word |
| } |
| } |

METHOD OF MAINTAINING EDIT SUMMARY INFORMATION ON A REWRITABLE STORAGE MEDIUM

BACKGROUND OF THE INVENTION

1. Field of the Invention

The present invention relates to a method for enabling fast editing of a plurality of interrelated files recorded on a rewritable storage medium.

2. Description of the Related Art

Recently, the standardization for new high-density rewritable optical disks capable of recording high-quality video and audio data for a long time is in rapid progress and new optical disk related products are expected to be commercially available on the market in the near future. The Blu-ray Disc Rewritable (BD-RW) is one of the new optical disks.

FIG. 1 illustrates a schematic diagram of a part of an optical disk apparatus such as a video disk recorder (VDR) that records/reproduces data on/from a storage medium like a BD-RW. The optical disk apparatus comprises an optical pickup 2 for reading recorded signals from a storage medium 1 such as a BD-RW or for recording input data on the storage medium 1, a VDR system 3 for processing the signals received from the optical pickup 2 or for converting an input data stream into a data stream formatted for recording, and an encoder 4 for encoding an input analog signal to output the encoded signal to the VDR system 3.

The optical disk apparatus reads play list information stored in a plurality of play list files recorded on the BD-RW 1 and displays the play list information as a selectable menu on a TV screen, as depicted in FIG. 2; therefore, a user may select a play list from the displayed play list information.

The VDR system 3 performs playback or editing of a data stream of the program corresponding to the play list selected as explained above.

FIG. 3 illustrates the file structure of a BD-RW. The root directory contains at least one DVR directory, which contains files such as 'info.dvr', 'menu.tidx', and 'mark.tidx' and subdirectories such as PLAYLIST, CLIPINF, and STREAM. The PLAYLIST directory contains play list files (*.rpls and *.vpls). The CLIPINF directory contains clip information files (*.clpi). The STREAM directory contains MPEG2-formatted A/V stream clip files (*.m2ts) corresponding to the clip information files.

The playback control information for the stream files stored in the STREAM directory, for example, '01001.m2ts' and '02000.m2ts', are stored in the files '01001.clpi' and '02000.clpi' contained in the CLIPINF directory, respectively. The play list information for determining continued playback or playback order of the files '01001.m2ts' and '02000.m2ts' are stored in the file '01001.rpls' contained in the PLAYLIST directory.

Consequently, the clip information files (*.clpi) containing playback control information for the A/V data streams recorded in the data stream files (*.m2ts) and the play list files (*.rpls and *.vpls) are related to each other. When a data stream is recorded as a clip, a play list referencing the clip is created automatically. Such a play list is called a real play list (*.rpls). A user may select partial intervals of recorded clips and create a play list referencing the selected intervals or clips. Such a play list is called a virtual play list (*.vpls).

As depicted in FIG. 4, Clip Info File 1 is referenced by both Real PlayList 1 and Virtual PlayList 1. Real PlayList 1 and Virtual PlayList 1 also reference Clip Info File 2. When deleting a part or the whole of RealPlayList 1 in response to a user's request, the VDR system 3 finds that Real PlayList 1 references Clip Info File 1 and Clip Info File 2 and scans the PLAYLIST directory for the virtual play lists referencing Clip Info File 1 and Clip Info File 2.

By the search operation, the VDR system 3 finds that Virtual PlayList 1 references Clip Info File 1 and Clip Info File 2 and inquires of the user whether to delete Virtual PlayList 1. Responsive to a confirmation for deleting Virtual PlayList 1 from the user, the VDR system 3 performs necessary steps to delete Virtual PlayList 1 and Real PlayList 1 to execute the user's request.

To delete or edit a real play list selected by a user, all the virtual play lists contained in the PLAYLIST directory should be scanned sequentially, which is a time consuming task.

In addition, in the case where a new real play list needs to be added by a user's request or as the result of partially deleting a clip file, the VDR system 3 should examine all play list files and clip information files to determine whether an additional play list may be created without exceeding the limits of the number of play items, the number of entries belonging to the entry point map, and the number of program sequences specified by the recording format of the BD-RW 1. Such a search operation makes editing operations slow.

SUMMARY OF THE INVENTION

In an effort to solve the foregoing problems, it is the object of the present invention to provide a method of maintaining edit summary information for enabling fast editing of real play lists, virtual play lists, and clip information files recorded on a rewritable storage medium in response to a user's editing request.

A method of maintaining edit summary information on a rewritable storage medium in accordance with one embodiment of the invention comprises the steps of creating edit summary information about play list files and clip information files linked with data stream clip files recorded on a storage medium and recording the created edit summary information on the storage medium.

A method of maintaining edit summary information on a rewritable storage medium in accordance with another embodiment of the invention comprises the steps of searching edit summary information about play list files and clip information files linked with data stream clip files recorded on a storage medium, the summary information being stored in a file distinct from the files, and responsive to a user's request to edit play lists, performing necessary steps with reference to the searched edit summary information.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 5 illustrates the syntax of 'info.dvr' file having the edit summary information (TableOfFastEditInfo) in accordance with one embodiment of the invention;

FIG. 6 illustrates the detailed structure of the edit summary information (TableOfFastEditInfo) in accordance with one embodiment of the invention;

FIG. 7 illustrates the syntax of 'info.dvr' file having the edit summary information (TableOfFastEditInfo) in accordance with another embodiment of the invention.

DETAILED DESCRIPTION OF THE PREFERRED EMBODIMENTS

In order that the invention may be fully understood, preferred embodiments thereof will now be described with reference to the accompanying drawings.

The file 'info.dvr' contains a maker's private data area (MakersPrivateData) reserved for storing various private data needed by BD-RW makers, as illustrated in FIG. 5. In a method in accordance with one embodiment of the invention, the edit summary information (TableOfFastEditInfo(i)) is stored in the data block of the maker's private data area (MakersPrivateData).

The edit summary information (TableOfFastEditInfo(i)) contains information necessary for linking real play list files (*.rpls), virtual play list files (*.vpls) placed in the PLAYLIST directory with clip information files (*.clpi) placed in the CLIPINF directory and additional information for determining whether to allow a new play list to be added, as shown in FIG. 6.

For instance, the edit summary information (TableOfFastEditInfo(i)) contains the total information about play items (total_n_of_PlayItems), the total information about entries (totoal_n_of_EP_coarse/fine entries), the total information about program sequences (total_n_of_program_sequences), and information about the total information (Total_n_info), all being necessary for determining whether to allow a new play list to be added. In addition, the number of real play lists (n_of_Real_PlayLists), the index or file name of each real play list (Real_PlayList_$_{file}$_index), the number of clip information files linked with each real play list (n_of_ref_to_Clip), and the index or file name of each clip information file (Clip_Info_file_index) are contained in the edit summary information.

Also, the edit summary information (TableOfFastEditInfo (i)) contains the number of total clip information files (n_of_Clip_Info_In_Real_PlayList), the index or file name of each clip information file (Clip_Info _file_Index), the number of virtual play list files referencing the clip information files (n_of_ref_to_virtual_PlayList), the write protection flag (write_protect_flag) stored in each real play list, and the index or file name of each virtual play list file (Virtual_PlayList_file_index).

The index of a play list file is an integer into which the file name of the play list file is converted. For example, the index of file '00037.cpli' can be '37'. The start address of clip information files linked with the real play lists (ClipInfo_in_Real_PlayList_start_address) is also contained in the edit summary information (TableOfFastEditInfo(i)). ClipInfo_in_Real_PlayList_start_address is the amount of data (in bytes) from the first byte of the edit summary information to n_of_Clip_Info_Real_PlayList, as shown in FIG. 6.

Figure 3:
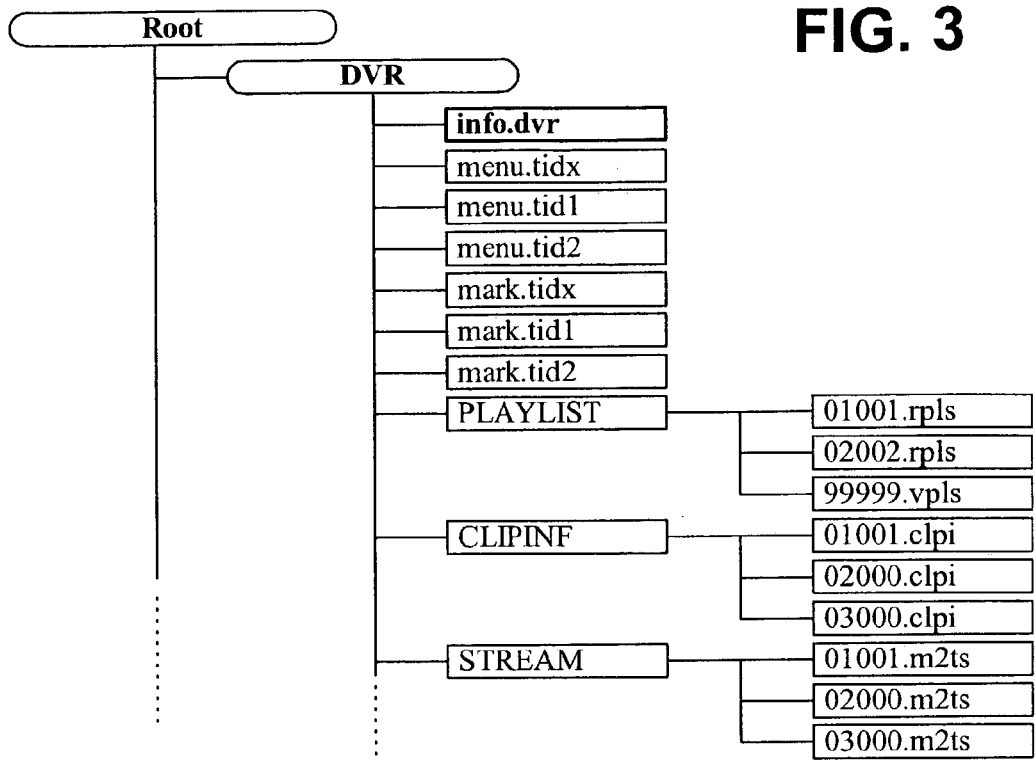
FIG. 3 illustrates the file structure of a rewritable optical disk (BD-RW)
Figure 4:
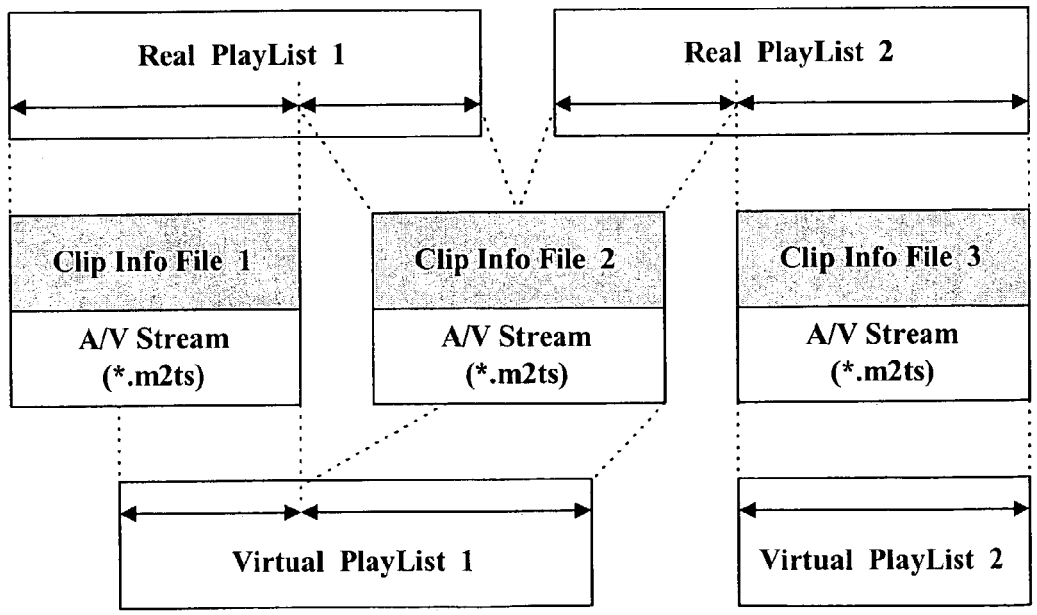
FIG. 4 illustrates the relations among real play lists, virtual play lists, and clip information files of a rewritable optical disk (BD-RW)

As a result, the syntax of the file 'info.dvr' having the edit summary information in accordance with the invention conforms to the file structure and the syntax of 'info.dvr' of the BD-RW explained above with reference to FIG. 3.

Figure 1:
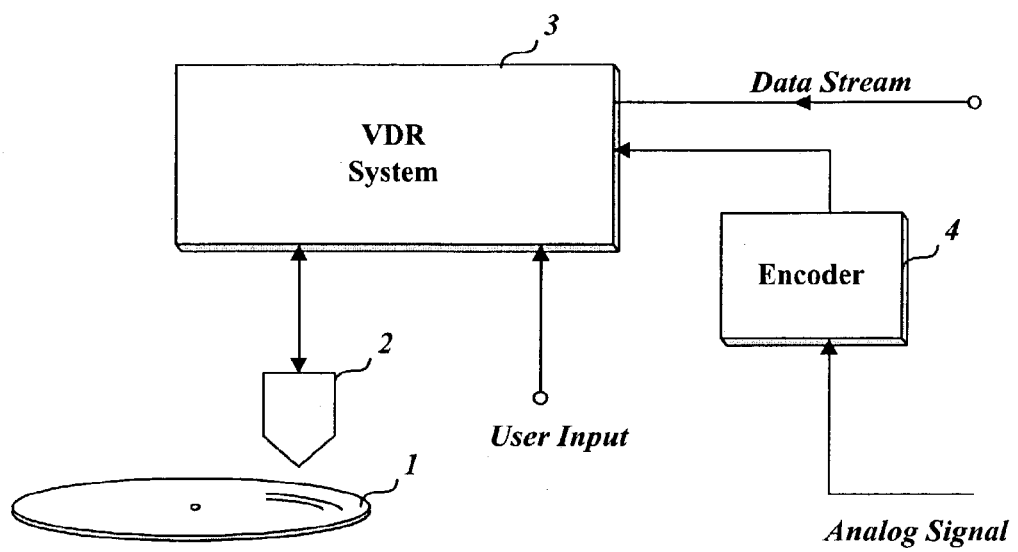
FIG. 1 illustrates a schematic diagram of a part of an optical disk apparatus such as a video disk recorder.
Figure 2:
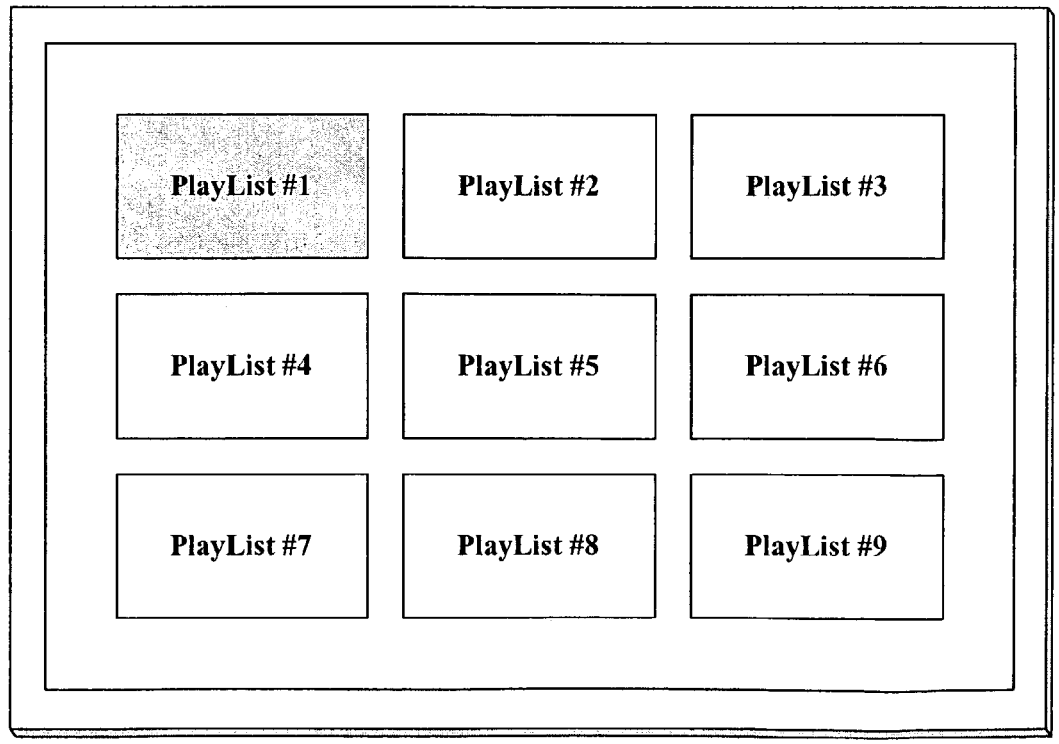
FIG. 2 illustrates a schematic diagram of a play list menu displayed for a rewritable optical disk (BD-RW)

The VDR system 3 of FIG. 1 can promptly obtain information about clip information files and virtual play list files linked with a real play list file and the numbers of play items, entries, and program sequences necessary to determine whether to add a new play list by consulting the edit summary information stored in the maker's private data area contained in the file 'info.dvr'.

For example, receiving a request to delete a part or the whole of Real PlayList 1, the VDR system 3 can easily find the clip information files, Clip Info File 1 and Clip Info File 2, linked with Real PlayList 1 by consulting the edit summary information. The VDR system 3 can also find virtual play lists referencing the found clip information files without scanning all the virtual play list files (*.vpls) placed in the PLAYLIST directory just by consulting the edit summary information In addition, the VDR system 3 can promptly inform the user whether Real PlayList 1 can be deleted or edited by examining the write_protect_flag of Real PlayList 1 in the edit summary information. On receiving the user's confirmation, the VDR system 3 can promptly perform necessary steps to execute the ask to delete Real PlayList 1 and Virtual PlayList 1.

In summary, deleting or editing a real play list does not require scanning all the virtual play list files (*.vpls) stored in the PLAYLIST directory, thereby resulting in fast editing of the real play list.

In the case of adding a new real play list by a user's request or as the result of partially deleting a clip file, the VDR system 3 can quickly determine whether a new real play list may be created just by examining the numbers of play items, entries belonging to the entry point map, and program sequences stored in the edit summary information.

In other words, it can be promptly determined whether an additional play list may be created without exceeding the limits of the number of play items, the number of entries belonging to the entry point map, and the number of program sequences, specified by the recording format of the BD-RW 1 without actually scanning all the play list files and clip information files.

FIG. 7 illustrates the syntax of 'info.dvr' in accordance with another embodiment of the invention, wherein the edit summary information (TableOfFastEditInfo) is stored in an area other than the maker's private data area (MakersPrivateData), for example, an area between the play list table area (TableOfPlayList) and the maker's private data area (MakersPrivateData).

In this case, the start address of the edit summary information (TableOfFasrEditInfo_start_address), together with the start address of the play list table (TableOfPlay Lists_start_address) and the start address of the maker's private data area (MakersPrivateData_start_address), is stored in the file 'info.dvr'.

Consulting the start address of the edit summary information stored in the file 'info.dvr', the VDR system 3 can locate the edit summary information.

The VDR system 3 can obtain the information about the clip information files and virtual play list files linked with real play list files and promptly perform necessary steps to execute a user's request by consulting the edit summary information located between the play list table area (TableofPlayList) and the maker's private data area (MakersPrivateData).

Figure 8:
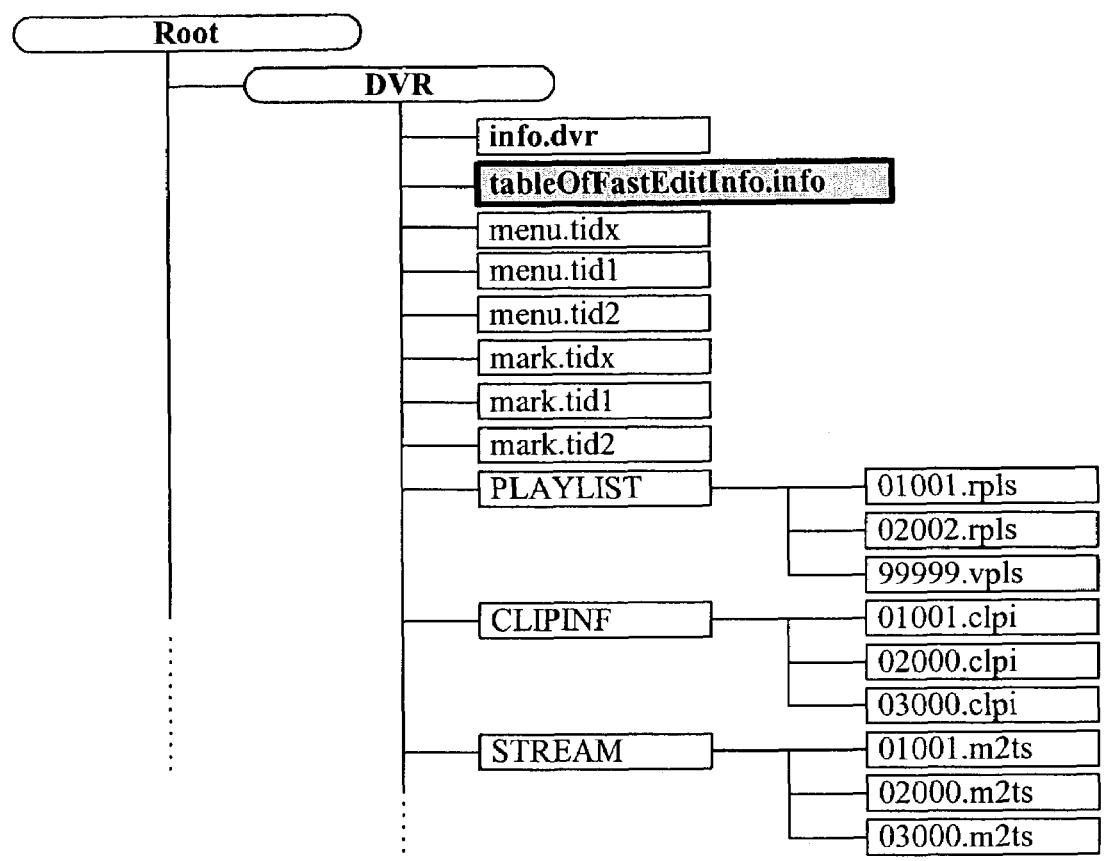
FIG. 8 illustrates the file structure of a rewritable optical disk (BD-RW) containing the edit summary information (TableOfFastEditInfo) in accordance with another embodiment of the invention.

The edit summary information can be stored in a file distinct from 'info.dvr', for example, in the file 'TableOfFastEditInfo.info', as illustrated in FIG. 8.

The method of maintaining edit summary information in accordance with the invention facilitates editing of play lists in response to a user's request to delete or edit a play list or to add a new play list by using the edit summary information.

Although certain specific embodiments of the present invention have been disclosed, it is noted that the present invention may be embodied in other forms without departing from the spirit or essential characteristics thereof. The present embodiments are therefore to be considered in all respects as illustrative and not restrictive, the scope of the invention being indicated by the appended claims, and all changes that come within the meaning and range of equivalency of the claims are therefore intended to be embraced therein.

What is claimed is:

1. A method of maintaining edit summary information on a storage medium, comprising:
   creating edit summary information about play list files and clip information files linked with data stream clip files recorded on the storage medium; and
   recording the created edit summary information on said storage medium,
   wherein the edit summary information includes a calculated total number of play list files and play items included in the play list files,
   wherein the recording step further comprises selectively performing or not performing a recording operation for recording play list files based on the calculated total number of play list files and play items, and
   wherein the recording operation includes at least one of recording new play list files, deleting play list files and editing play list files, and
   wherein the recording step comprises performing the recording operation for new play list files if the calculated total number of play lists files and play items is less than a maximum amount of play list files and play items being capable of recording on the recording medium.

2. The method of claim 1, further comprising:
   storing said edit summary information in an upper directory of a directory in which said play list files and clip information files are stored.

3. The method of claim 1, wherein said edit summary information is stored in a file named 'info.dvr'.

4. The method of claim 3, wherein said edit summary information is stored in the maker's private data area of said 'info.dvr' file.

5. The method of claim 3, wherein said 'info.dvr file' further contains position information indicative of a position where said edit summary information is stored.

6. The method of claim 1, wherein said edit summary information is placed in a subdirectory of a root directory in a directory hierarchy of said storage medium.

7. The method of claim 1, wherein said edit summary information further includes a calculated total number of entries of an entry point, and number of program sequences.

8. The method of claim 1, wherein said play list files include real play lists created when clip files are recorded and virtual play lists created when some intervals of recorded clip files are selected.

9. The method of claim 8, wherein said edit summary information further includes write protection flags contained in a file of the virtual play list.

10. The method of claim 1, wherein the recording step checks the calculated total number of play list files and play items included in the play list files and does not record a new play list file and play item if the calculated total number is equal to or greater than the maximum amount of play list files and play items.

11. A method of maintaining edit summary information on a storage medium, comprising:
    searching edit summary information about play list files and clip information files linked with data stream clip files recorded on a storage medium, said summary information being stored in a file distinct from said play list and clip information files; and
    performing, responsive to a user's request, necessary steps with reference to the searched edit summary information,
    wherein the edit summary information includes a calculated total number of play list files and play items included in the play list files,
    wherein the performing step further comprises performing or not performing a recording operation for recording play list files based on the calculated total number of play list files and play items,
    wherein the recording operation includes at least one of recording new play list files, deleting play list files and editing play list files, and
    wherein the performing step comprises performing the recording operation for new play list files if the calculated total number of play lists files and play items is less than a maximum amount of play list files and play items being capable of recording on the recording medium.

12. The method of claim 11, wherein said edit summary information is placed in a subdirectory of a root directory in a directory hierarchy of said storage medium.

13. The method of claim 11, wherein said edit summary information is stored in a file named 'info.dvr'.

14. The method of claim 13, wherein said edit summary information is stored in the maker's private data area of said 'info.dvr' file.

15. The method of claim 14, wherein said searching step searches said edit summary information for play list summary information.

16. The method of claim 11, wherein said play list files include real play lists created when clip files are recorded and virtual play lists created when some intervals of recorded clip files are selected.

17. The method of claim 16, wherein said searching step comprises:
    responsive to a request to delete a real play list, searching for clip information files linked with the real play list and searching for virtual play lists linked with the clip information files with reference to said edit summary information; and
    examining a status of write protection flags of the searched virtual play lists with reference to said edit summary information and checking the user's confirmation to delete the real play list.

18. The method of claim 11, wherein said searching step comprises:
    examining the number of play items, a number of entries of an entry point, and a number of program sequences from said edit summary information when adding a new real play list; and
    determining whether to add the new real play list file based upon a result of the examination.

19. The method of claim 11, wherein the performing step checks the calculated total number of play list files and play items included in the play list files and does not record a new play list file and play item if the calculated total number is equal to or greater than the maximum amount of play list files and play items.

20. A method for controlling a recording operation on a recording medium, the method comprising:

calculating via a controller, a total number of play list files and play items included in the play list files already recorded on the recording medium, before performing the recording operation; and selectively performing or not performing the recording operation based on the calculated total number of play list files and play items, wherein the recording operation includes at least one of recording new play list files, deleting play list files and editing play list files, and wherein the recording step comprises performing the recording operation for new play list files if the calculated total number of play lists files and play items is less than a maximum amount of play list files and play items being capable of recording on the recording medium.

21. The method of claim 20, wherein the performing step checks the calculated total number of play list files and play items included in the play list files and does not record a new play list file and play item if the calculated total number is equal to or greater than the maximum amount of play list files and play items.

22. An apparatus for controlling a recording operation on a recording medium, comprising:

a controller configured to calculate a total number of play list files and play items included in the play list files already recorded on the recording medium, before performing the recording operation, and to selectively perform or not perform the recording operation based on the calculated total number of play list files and play items, wherein the recording operation includes at least one of recording new play list files, deleting play list files and editing play list files; and a pickup unit, operably coupled to the controller, and configured to record data according to the recording operation, and wherein the controller is configured to perform the recording operation for new play list files if the calculated total number of play lists files and play items is less than a maximum amount of play list files and play items being capable of recording on the recording medium.

23. The apparatus of claim 22, wherein the controller is further configured to check the calculated total number of play list files and play items included in the play list files and does not control the pickup unit to record a new play list file and play item if the calculated total number is equal to or greater than the maximum amount of play list files and play items.

* * * * *